United States Patent [19]

Okuyama et al.

[11] Patent Number: 5,200,965
[45] Date of Patent: Apr. 6, 1993

[54] SYSTEM FOR ADJUSTING LASER OSCILLATOR

[75] Inventors: Kazuhiro Okuyama; Kohji Inamoto, both of Ootawara, Japan

[73] Assignee: Kabushiki Kaisha Toshiba, Kawasaki, Japan

[21] Appl. No.: 815,751

[22] Filed: Jan. 2, 1992

[30] Foreign Application Priority Data

Jan. 8, 1991 [JP] Japan ............................... 3-494
Dec. 19, 1991 [JP] Japan ............................... 3-336476

[51] Int. Cl.$^5$ ............................................. H01S 3/13
[52] U.S. Cl. .................................. 372/29; 372/107; 372/108; 372/38
[58] Field of Search ............... 372/107, 108, 29, 98, 372/92, 38

[56] References Cited

U.S. PATENT DOCUMENTS

| 4,939,739 | 7/1990 | Hobart et al. | 372/107 |
| 4,972,424 | 11/1990 | Wissman | 372/107 |
| 5,018,150 | 5/1991 | Wojnarowski et al. | 378/107 |
| 5,033,001 | 7/1991 | Hobart et al. | 372/107 |
| 5,121,405 | 6/1992 | Negus | 372/107 |

Primary Examiner—Léon Scott, Jr.
Attorney, Agent, or Firm—Cushman, Darby & Cushman

[57] ABSTRACT

In a system for adjusting a laser oscillator, a laser beam from a laser oscillator is detected by a power detector 22 and one of the resonant mirrors is tiltably supported by a tilting mechanism. Power signal from the detector is sampled and sampled signals are averaged by a central processing unit to obtain power average values. The power average values are compared with a power distribution curve which relates to a tilting angle of the resonant mirrors. Thus, the central processing unit determines a control value corresponding to the tilting angle of the resonant mirrors.

9 Claims, 11 Drawing Sheets

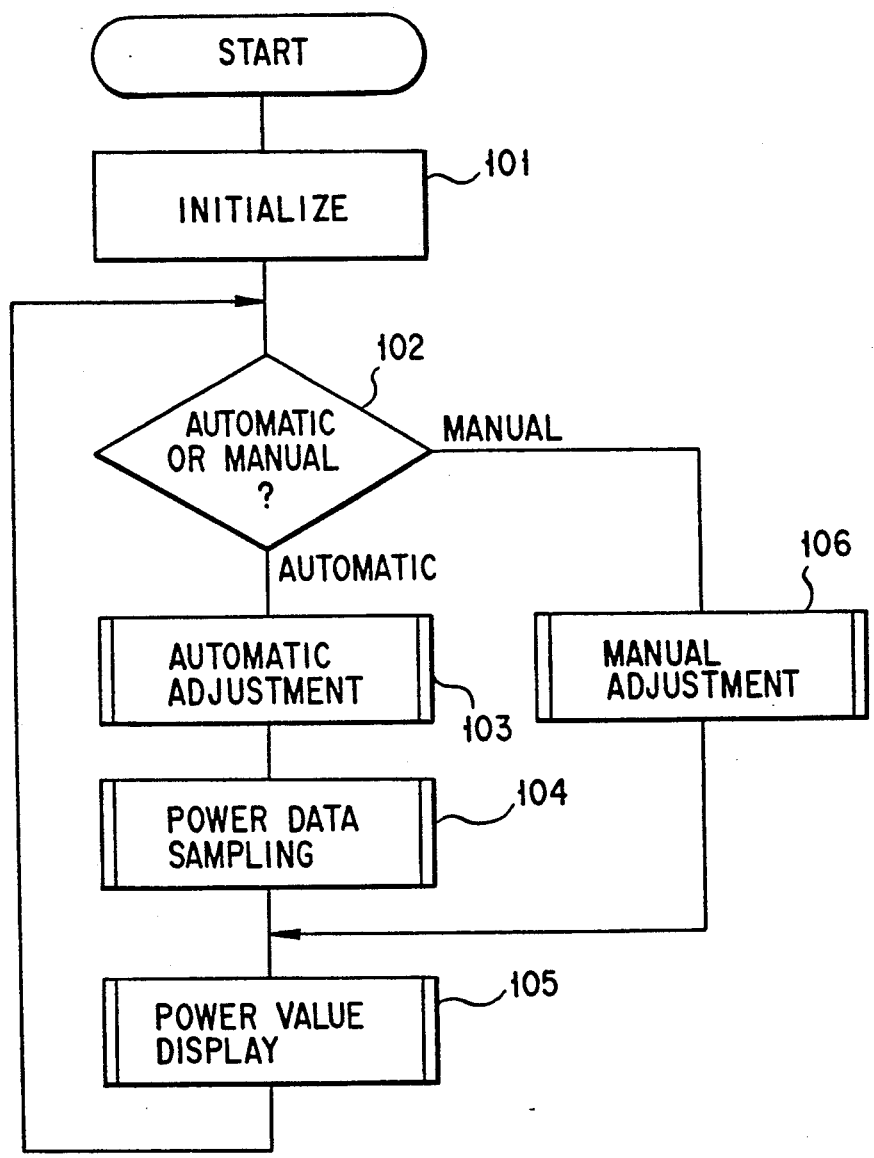
F I G. 5

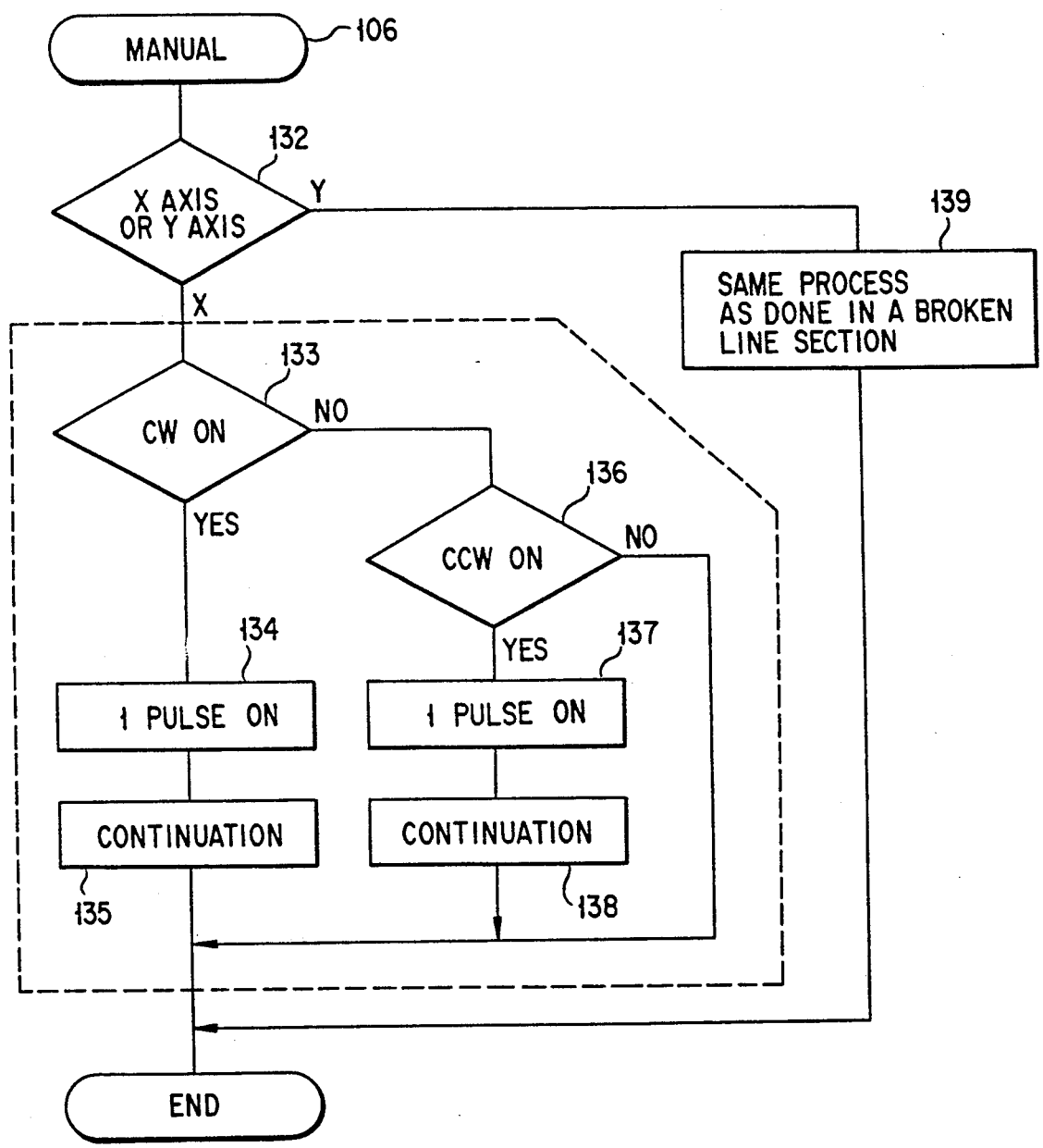
F I G. 10

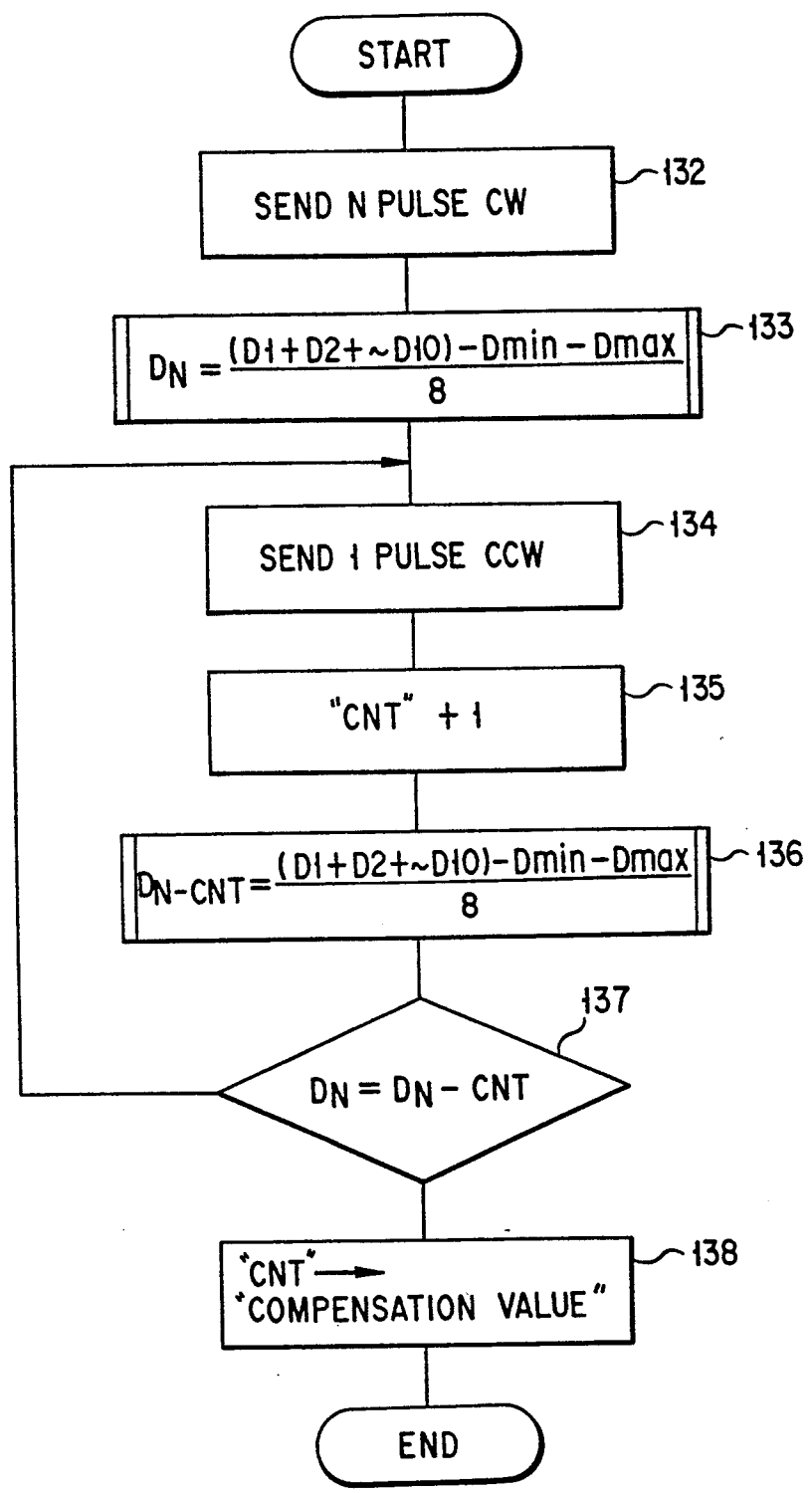
F I G. 11

SYSTEM FOR ADJUSTING LASER OSCILLATOR

BACKGROUND OF THE INVENTION

1. Field of the Invention

The present invention relates to a system for adjusting a laser oscillator, and more particularly, to a system for monitoring power of a laser beam from a laser oscillator and determining an alignment parameter corresponding to a peak value to thereby adjust the laser oscillator.

2. Description of the Related Art

In general, the power of a laser beam emanated from a laser oscillator varies depending on the alignment of the laser oscillator, particularly, on the alignment of resonant mirrors that defines an optical resonator. To oscillate the laser oscillator under the optimal conditions to generate a laser beam of peak power, therefore, it is necessary to align the resonant mirrors and form an optical resonator therebetween.

As such a system for adjusting a laser oscillator is proposed the one shown in FIGS. 1 and 2.

FIG. 1 illustrates a conventional system for adjusting a laser oscillator, which has a laser medium 11 positioned between fixed bases 12-1 and 12-2 arranged to face each other. The fixed bases 12-1 and 12-2 have openings 12a formed in their center portions to permit a laser beam to pass through. Movable bases 14-1 and 14-2 each having a resonant mirror 13 in the center portion are arranged outside the respective fixed bases 12-1 and 12-2. Feed screws 15 and 16 are screwed in the respective two orthogonal corners of each movable base 14-1 or 14-2, with their distal ends abutting on the outer surface of the associated laser beam 12-1 or 12-2, as shown in FIG. 2. A hinge 17 is provided in the lower right corner (in FIG. 2) of one of the movable bases 14-1 and 14-2 and the facing corner of the other movable base between the fixed bases 12-1 and 12-2, so that the movable bases 14-1 and 14-2 can tilt in two perpendicular directions (hereinafter simply referred to as "X direction" and "Y direction") about these corners. Therefore, rotating one of the feed screws, 15, will tilt the movable bases 14-1 and 14-2 and the resonant mirrors 13-1 and 13-2 provided integral with the movable bases in the Y direction, and rotating the other feed screw 16 will tilt the movable bases 14-1 and 14-2 and the resonant mirrors 13-1 and 13-2 in the X direction.

The feed screws 15 and 16 respectively for the Y and X axes, which are provided on the movable base 14-1 (on the right-hand side in FIG. 1), have knobs 19 that permit the feed screws 15 and 16 to rotate. To the Y-axis and X-axis feed screws 15 and 16 provided on the other movable base 14-2 (on the left-hand side in the diagram) are coupled a Y axis driving motor 21 and an X axis driving motor 22, respectively, to drive forward and backward the associated feed screws 15 and 16.

The movable base 14-1 on the right-hand side in the diagram has an opening 14a formed in the center portion, through which a laser beam passing through the resonant mirror 13-1 provided in the center portion is guided outside. The laser beam 24 led out through the opening 14a enters a power detector 27 via a beam splitter 26, and its power is detected there.

Data of the laser power detected by the power detector 27 is sent to a comparator 28 where it is compared with a previously set peak value. The result of the comparison is input to a central processing unit 31. Based on the discrimination result, the central processing unit 31 sends a control command to a Y axis motor drive instructing section 33 for the Y axis driving motor 21 or an X axis motor drive instructing section 32 for the X axis driving motor 22 to acquire a peak value.

In the system shown in FIG. 1, the alignment of the resonant mirrors 13 of the laser oscillator is adjusted as follows. First, the resonant mirror 13-1 is positioned perpendicular to the optical axis of the laser beam 24 and fixed there by manipulating the knobs 19 of the feed screws 15 and 16 of the movable base 14. Likewise, the resonant mirror 13-2 is temporarily adjusted perpendicular to the optical axis. After such temporary adjustment is finished, the laser oscillator is activated as follows to start the real adjustment. It is known that in the laser oscillator, the light emanating from the laser medium 11 is repetitively reflected between the resonant mirrors 13-1 and 13-2 to be oscillated, and is output as the laser beam 24 passing through one of the resonant mirrors 13-1. This laser beam 24 is detected by the power detector 27, and the detection data is sent out to the comparator 28. This data is compared with the predetermined peak value to discriminate whether or not it is the peak value, before it is input to the central processing unit 31. The central processing unit 31 activates the X axis driving motor 22 and Y axis driving motor 21 via the respective X axis and Y axis motor drive instructing sections 32 and 33 to adjust the position of the other resonant mirror 13-2. In other words, the central processing unit 31 sends operation instructions reflecting the rotational direction and the amount of rotation of the X axis and Y axis driving motors 22 and 21 to the X axis and Y axis motor drive instructing sections 32 and 33 in accordance with the input value. As a result, the resonant mirrors 13 are tilted slightly in a predetermined direction. The peak value of the laser power is detected by repeating the above-described operation. That is, the peak value of the laser power is found by a control system which expects the peak value at a certain single point as described above.

This adjusting method, however, gives rise to the following shortcoming. According to this method, adjustment is conducted on the assumption that the peak value lies on a certain single point, and no judgment is made on where on the overall output distribution the current output corresponds. It therefore takes time to reach the peak value, impeding to speeding up the adjustment of the peak value. If this process is performed every time the laser is changed, the time for the intended operation of the laser oscillator would undesirably become shorter.

The laser output has a fluctuation width (hereinafter called "ripple"), so that when the laser output at one point on the output distribution is measured, the peak value of the ripples may be erroneously judged as the peak value of the laser output power.

Further, the laser output will vary depending on the environmental conditions, such as temperature and vibration, under which the laser is used, so that a user should always perform the scanning of the peak value while monitoring the environment. Furthermore, the peak value varies from one product to another of the same kind, requiring a control method or a certain value designed specifically for each product.

In short, it is difficult to improve the speed for the conventional adjustment of the peak value of the laser power and it is possible that the peak value of the ripples is mistaken for the peak value of the laser output power. In addition, the scanning of the peak value cannot be spontaneously dealt with when the laser output changes due to a change in the environmental conditions, and the conditions for scanning the peak value vary between products of the same kind.

SUMMARY OF THE INVENTION

It is therefore an object of the present invention to provide a method and a system for adjusting a laser oscillator, which can automatically set a peak value at high accuracy and high speed without any erroneous discrimination of the peak value of laser power, and can activate the laser oscillator based on that peak value.

A system for adjusting laser power to a peak value includes a pair of resonant mirrors arranged face to face and perpendicular to a laser beam, with a laser medium positioned therebetween. One of the resonant mirrors is independently driven in the X direction or Y direction by an associated motor, and during the mirror driving, the laser power is detected occasionally and the angles of the resonant mirrors are adjusted to acquire the peak value of the laser power. In this adjustment, the laser power is sampled by a predetermined number of times for individual detection points for the laser power, the sampled values are averaged, and it is determined where on the output distribution each sampled value lies for each detection point from the amount of change between the laser power average value at the current and the previous detection points. Depending on the positive or negative sign of the mentioned amount of change, the amount of displacement corresponding to the aforementioned predicted value, and the direction of the displacement determined from the changed direction are given to the associated one of the X axis and Y axis driving motors. In this driving of the resonant mirrors, the amount of displacement corresponding to a predicted value on the output distribution is set smaller as the predicted value approaches the peak value, and with respect to the inversion of the displacement direction near the peak value, the amount of displacement is determined in consideration of a predetermined, fixed value for a mechanical backlash. After the peak value is detected, a change in that peak value is monitored and is compared with a certain set value. When the peak value is detected to be below the predetermined value, an alarm will be generated.

According to the present invention, for each detection point, laser power is sampled by a predetermined number of times and the average values of the sampled values are acquired, so that the peak value of ripples will not be mistaken for the peak value of the laser output. Further, the amount of change in laser power and the direction of the change are acquired for each detection point, and it is then determined from these data where on the laser power output distribution the average values lie. In addition, as the determined or predicted value approaches the peak value, the amount of displacement is set smaller. It is therefore possible to scan the laser power at high accuracy and high speed and automatically set it to the proper level.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 5 is a flowchart showing an adjusting method for the system of the present invention for adjusting a laser oscillator;

FIG. 10 is a flowchart showing detailed steps for manual adjustment in the flowchart in FIG. 5;

FIG. 11 is a flowchart showing procedures of acquiring a mechanical backlash which is inherent to the system shown in FIG. 4.

DETAILED DESCRIPTION OF THE PREFERRED EMBODIMENTS

A preferred embodiment of the present invention will now be described referring to the accompanying drawings.

Figure 1:
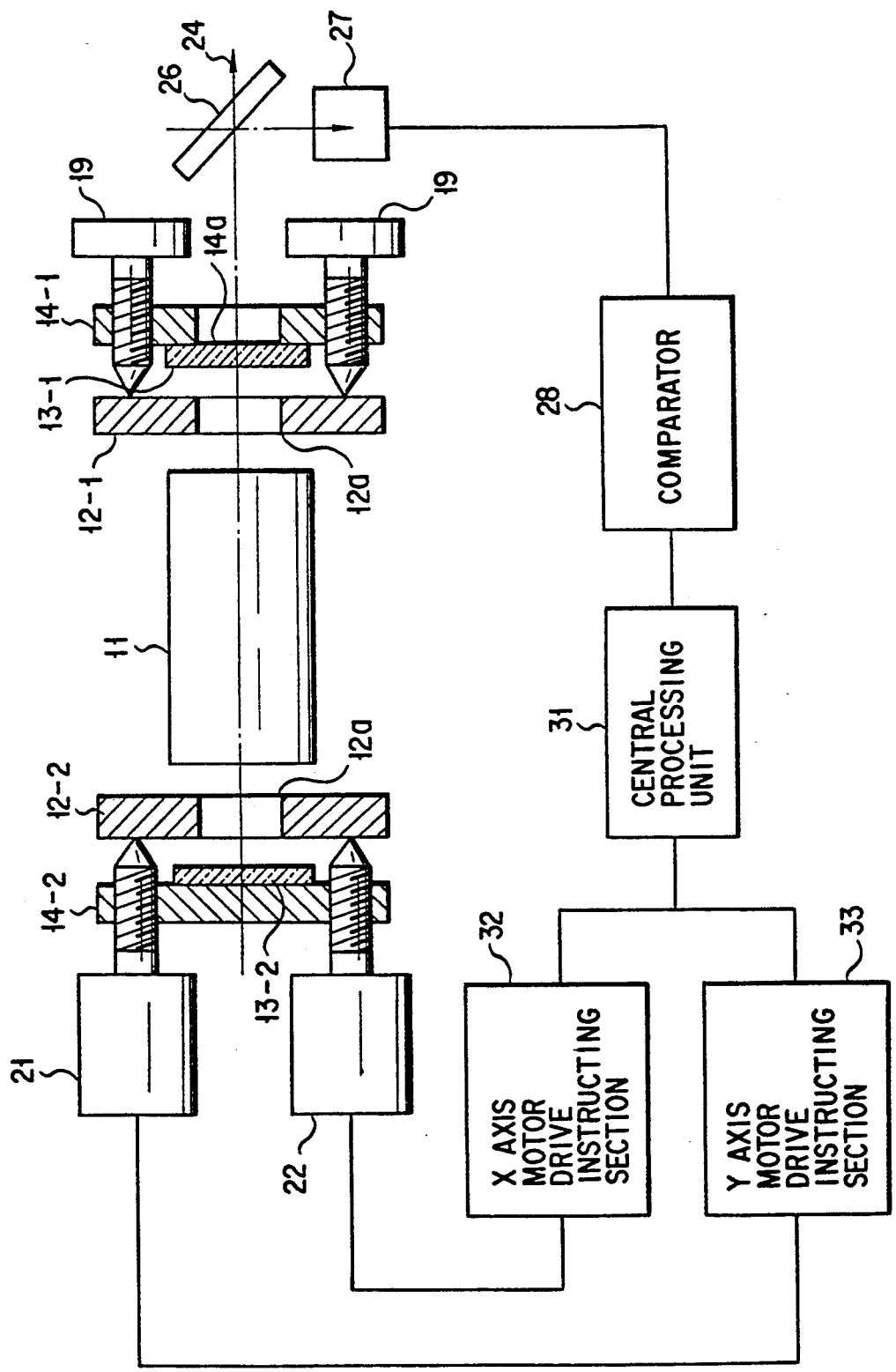
FIG. 1 is a schematic diagram illustrating a conventional system for adjusting a laser oscillator.
Figure 2:
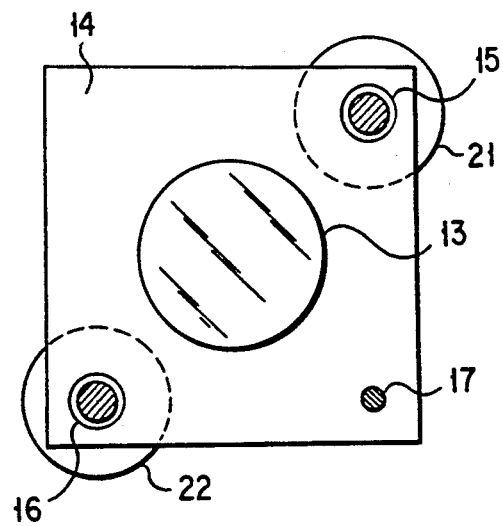
FIG. 2 is a plan view of the structure for movably supporting resonant mirrors shown in FIG. 1.
Figure 3:
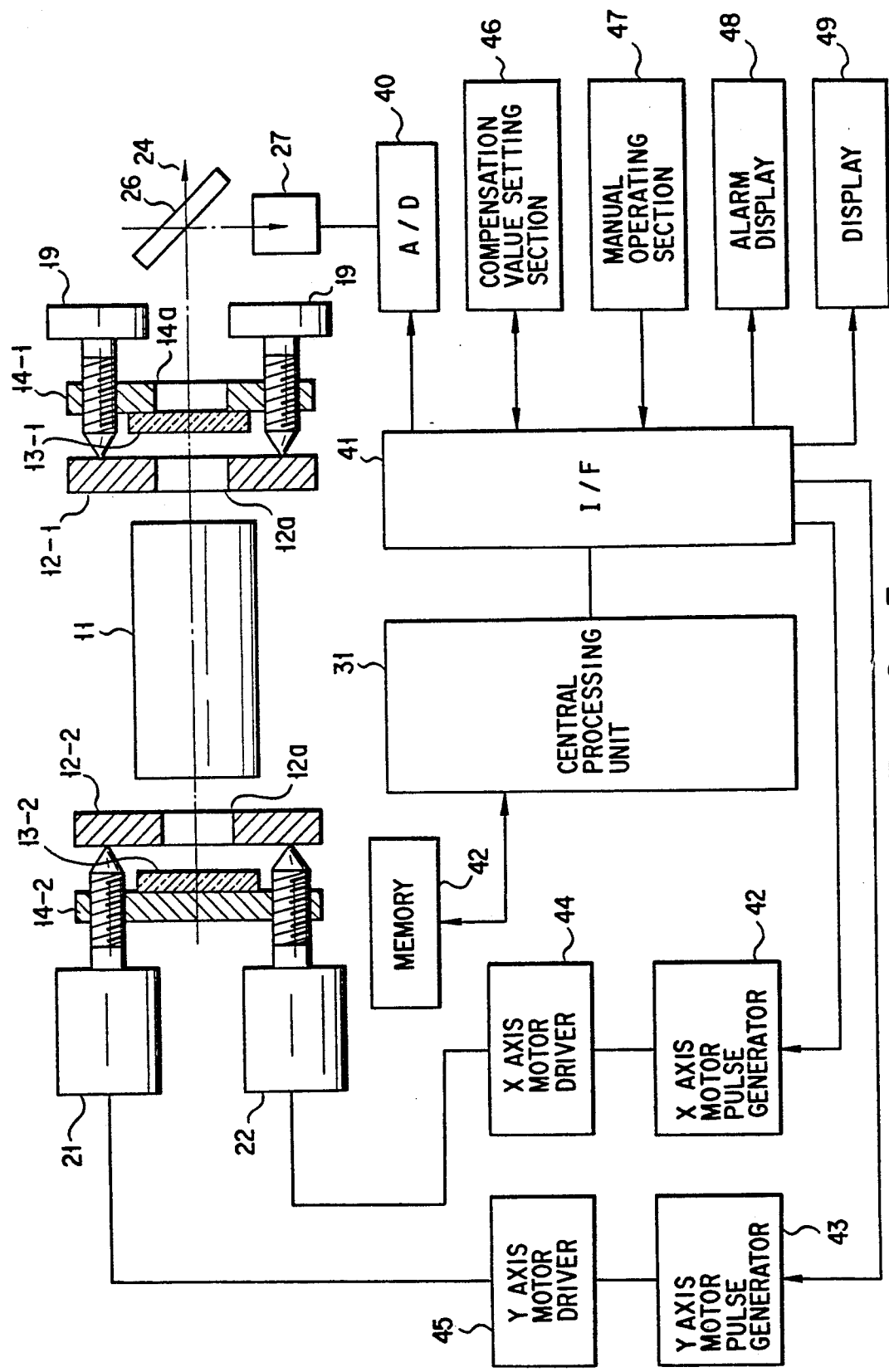
FIG. 3 is a schematic diagram showing a system for adjusting a laser oscillator according to the present invention.

FIG. 3 illustrates a system according to the present invention for adjusting a laser oscillator, which has a mechanism similar to that of the conventional laser oscillator adjusting system shown in FIG. 1. The system in FIG. 3 has a laser medium 11 positioned between fixed bases 12-1 and 12-2 arranged to face each other. The fixed bases 12-1 and 12-2 have openings 12a formed in their center portions to permit a laser beam to pass through. Movable bases 14-1 and 14-2 each having a resonant mirror 13 in the center portion are arranged outside the respective fixed bases 12-1 and 12-2. Feed screws 15 and 16 are screwed in the respective two orthogonal corners of each movable base 14-1 or 14-2, with their distal ends abutting on the outer surface of the associated laser beam 12-1 or 12-2, in the same manner as shown in FIG. 2. A hinge 17 is provided between the fixed bases 12-1 and 12-2, so that the movable bases 14-1 and 14-2 can tilt in two perpendicular directions, "X direction" and "Y direction." Therefore, rotating one of the feed screws 16, will tilt the movable bases 14-1 and 14-2 and the resonant mirrors 13-1 and 13-2 provided integral with the movable bases in the X direction, and rotating the other feed screw 15 will tilt the movable bases 14-1 and 14-2 and the resonant mirrors 13-1 and 13-2 in the Y direction.

The feed screws 15 and 16 respectively for the X and Y axes, which are provided on the movable base 14-1, have knobs 19 that permit the feed screws 15 and 16 to rotate. To the Y-axis and X-axis feed screws 15 and 16 provided on the other movable base 14-2 (on the left-hand side in the diagram) are coupled a Y axis driving motor (stepping motor) 21, and an X axis driving motor (stepping motor) 22, respectively, to drive forward and backward the associated feed screws 15 and 16.

The movable base 14-1 has an opening 14a formed in the center portion, through which a laser beam passing through the resonant mirror 13-1 provided in the center portion is guided outside. The laser beam 24 led out through the opening 14a enters a power detector 27 via a beam splitter 26, and its power is detected there.

Signals of the laser power detected by the power detector 27 are converted into digital signals one after another by an A/D converter 40. The digital signals are then sent to a central processing unit 31 through an interface 41. Upon each signal reception, the central processing unit 31 performs an averaging process on the detected signal and stores the resultant data as power data in a memory. The power data is compared with a predicted peak value by the central processing unit 31. In accordance with a comparison, the central processing unit 31 executes commands to X axis and Y axis motor pulse generators 42 and 43 to drive those generators 42 and 43 to acquire the peak value. As a result, drive signals are generated from Y axis and X axis motor drivers to drive the Y axis and X axis driving motors 21 and 22. The mirror 13-2 is thus tilted.

When the feed screws 15 and 16 coupled respectively to the X axis and Y axis driving motors 21 and 22 are rotated from a normal feeding direction to a returning direction or vice versa, backlashes usually occur. To compensate for the backlashes, a compensation value setting section 46 which stores a backlash compensation value is connected as an external memory device to the central processing unit 31 through the interface 41. A manual operating section 47 is also connected to the central processing unit 31 via the interface 41 to adjust the tilting of the mirror 13-2. Further, an alarm display section 48 for giving an alarm and a display section for displaying power data are connected to the central processing unit 31 via the interface 41. The manual operating section 47 receives various commands including a start command from outside.

Figure 4:
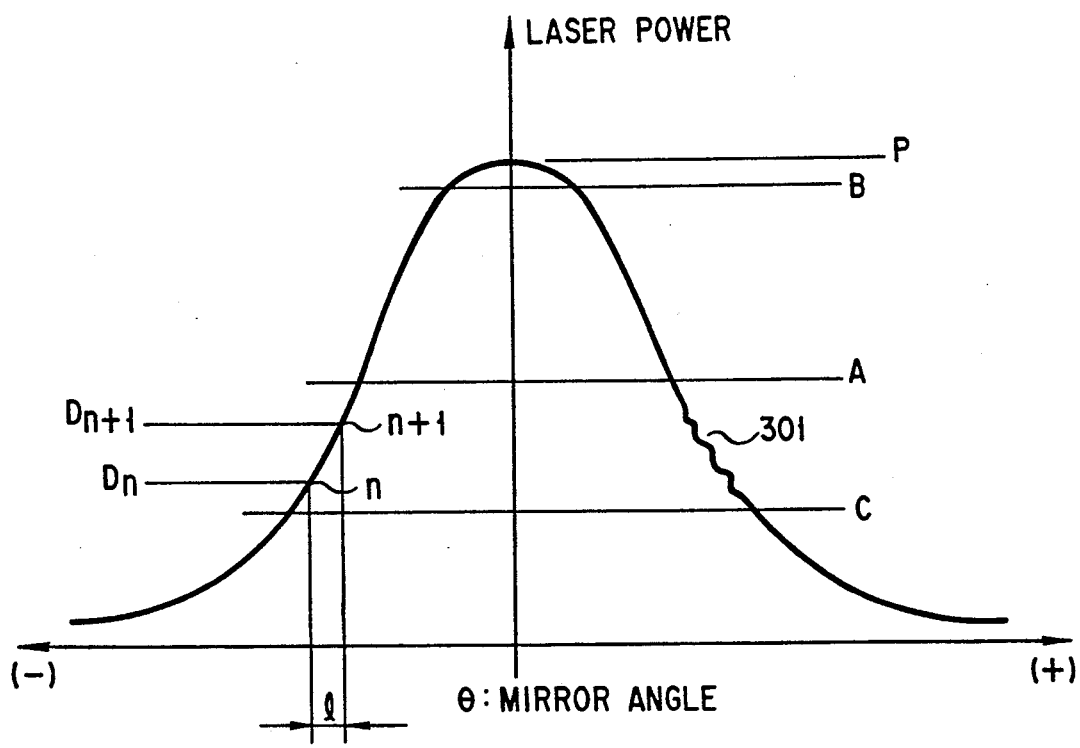
FIG. 4 is a diagram illustrating the output distribution of laser power.

The above-described system for adjusting a laser oscillator detects peak power following the basic principle below. The output of the laser power varies generally depending on the angles and positions of the resonant mirrors 13-1 and 13-2. Particularly, when the resonant mirrors 13-1 and 13-2 keep the optimal distance in between, the change in the angle of the resonant mirror 13-2 causes the output distribution of a laser beam as shown in FIG. 4. The resonant mirror 13-2 is tilted to have the angle and position adjusted, in such a way that a peak value of the laser beam will appear in the output distribution in FIG. 4. The inclination of the resonant mirror 13-2 will be adjusted along the X and Y axes which are perpendicular to each other.

The method according to the present invention for adjusting a laser oscillator will now be described.

In the adjusting system shown in FIG. 3 as well as the system in FIG. 1, alignment of the resonant mirrors 3 in the laser oscillator is adjusted as follows. First, temporary adjustment is conducted. The feed screws 15 and 16 of the movable bases are driven by knobs to tilt the resonant mirror 13-1 to perpendicular to the optical axis of the laser beam, and to fix the position of the mirror 13-1. Likewise, the resonant mirror 13-2 is temporarily tilted with its face almost perpendicular to the optical axis. After the temporary adjustment is completed, the laser oscillator is operated to start the real adjustment of the mirrors 13.

In the real adjustment process, a start switch (not shown) for the real adjustment is set on, and initialization is performed in step 101, as shown in FIG. 5. It is checked in step 102 if the real adjustment should be done automatically or manually. When automatic adjustment is selected, the laser power is sent one after another to the central processing unit 31 via the A/D converter 40 and the interface 41, permitting the automatic adjustment to start in step 103 to be explained in detail. The laser beam, which is sent from the resonant mirror 13-1 of the laser oscillator, is reflected by the beam splitter 26 toward the laser power detector 27 where the laser power is detected. The detected signal from the laser power detector 27 is converted into a digital signal by the A/D converter 40, and the detected digital signal is sent to the central processing unit 31 by the interface 41. The central processing unit 31 processes the received signal data, and supplies control commands X axis and Y axis motor pulse generators 42 and 43 which forces the motor drivers 44 and 45 to drive the motors 22 and 21. The resonant mirror 13-2 is therefore tilted, which changes the laser power.

Sampling is performed on the laser power one after another to make laser data and the alarm display section 48 displays an alarm in step 104. The central processing unit 31 allows the display section 49 to display power value of the detected signal as value data in step 105. Upon every tilting of the resonant mirror 13-2, the processes in the steps 102 through 105 are repeated multiple times, for example, three times, to determine the optimal position of the resonant mirror 13-2.

Figure 6:
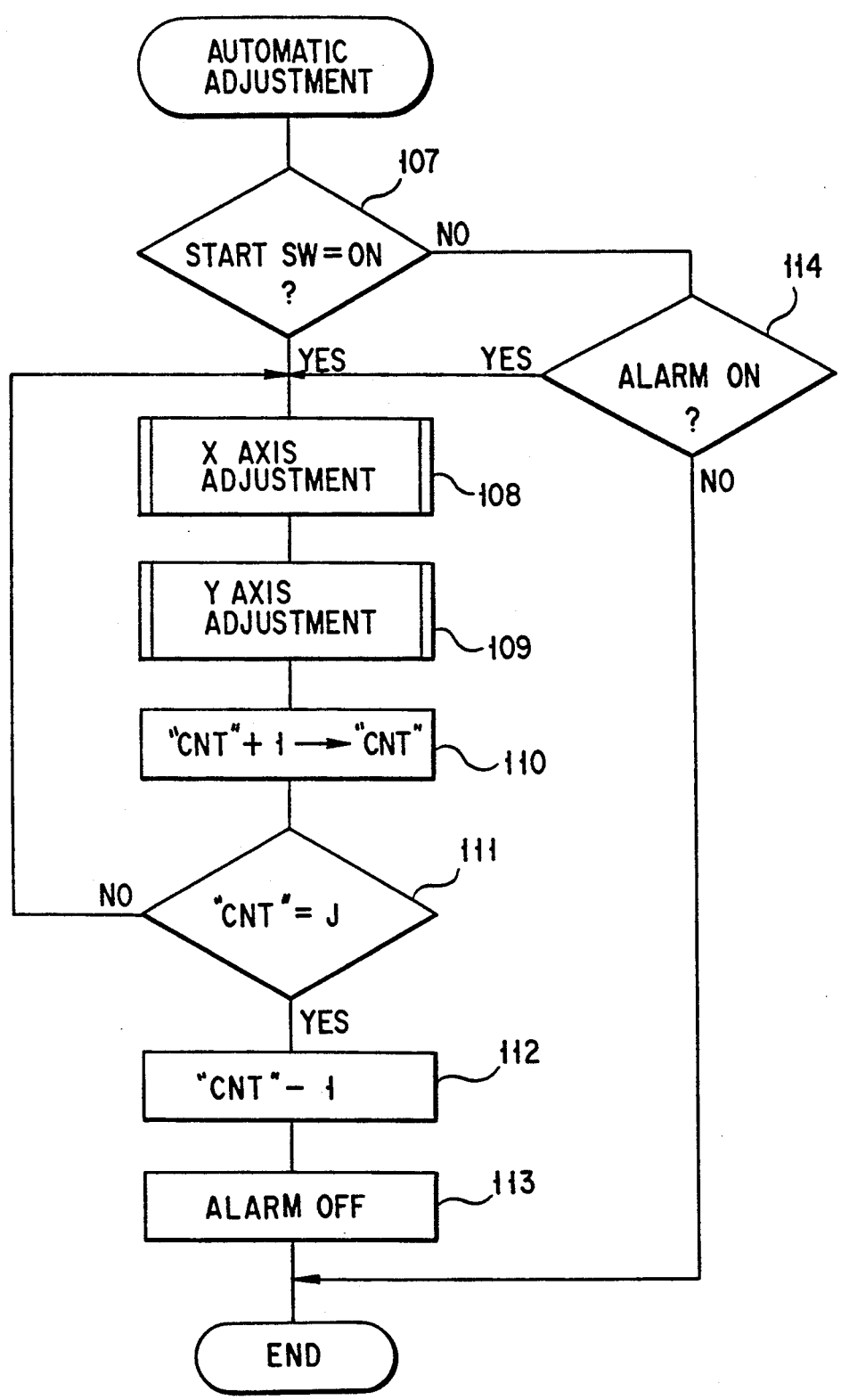
FIG. 6 is a detailed flowchart showing steps for automatic adjustment in the flowchart in FIG. 5.
Figure 7:
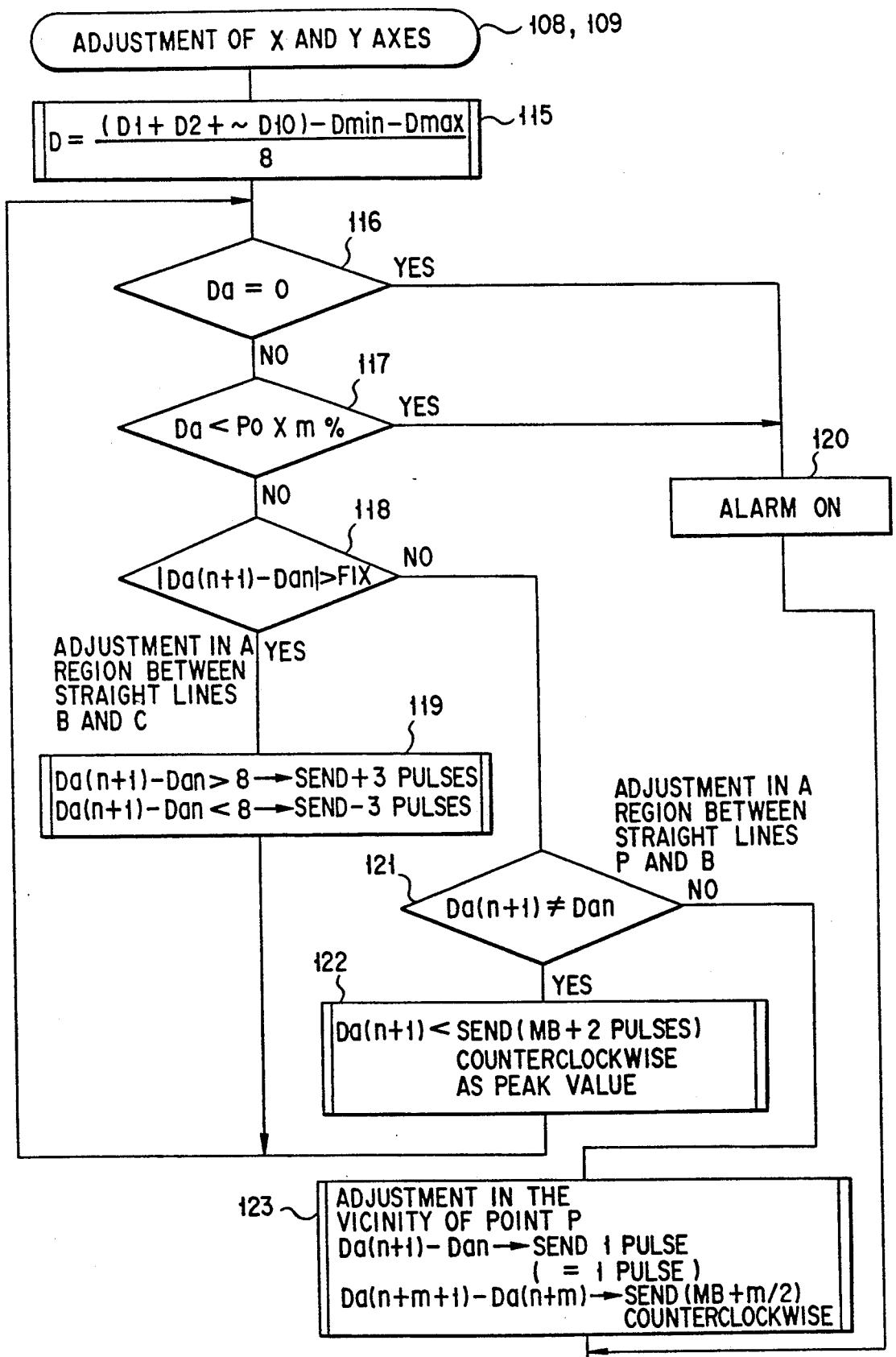
FIG. 7 is a detailed flowchart presenting steps for adjustment of X and Y axes in the flowchart in FIG. 6.

For the automatic adjustment shown in FIG. 5, it is checked in step 107 of the flowchart in FIG. 6 that the start switch for automatic adjustment is set on. If that switch is off and the alarm is not rendered on in step 114, the automatic adjustment is not performed. If the start switch for automatic adjustment is set on, or the alarm is rendered on in step 114 with that start switch being off, the resonant mirror 13-2 is adjusted for the X axis in step 108, and then for the Y axis in step 109. In adjusting the mirror 13-2 for X and Y axes, the central processing unit 31 computes average values D of the laser power for both axes in step 115 in FIG. 7. With the start switch for automatic adjustment rendered on, the resonant mirror 13-2 automatically tilts according to a predetermined program which is stored in the memory, changing the angles $\theta$ to the X and Y axes continuously. In accordance with this change, power data Dn and Dn+1 ("n" is an integer) is subjected to sampling as shown in FIG. 4, so that multiple pieces of power data, for example, ten pieces of power data D1 to D10 are sequentially sent to the central processing unit 31. The power data includes the ripples 301. To prevent misjudgment of any of the ripples 301 as a peak value, a laser power value is subjected to sampling a predetermined number of times, for example, ten times for every detection point, for example, every n point on the output distribution shown in FIG. 4. The resultant sampling values are averaged. A normal sampling speed is a ripple cycle divided by $10^n$.

The central processing unit 31 computes average data Da from the ten pieces of power data D1 to D10 excluding the maximum and minimum power data Dmax and Dmin. If the average data Da is "0" in step 116, the laser power will not be detected. An alarm for suggesting the activation of the laser is given in step S120, thus completing the adjustment of the X and Y axes. If the average data Da is not "0," m% of peak power Po, i.e., "Po·m%" is compared with the average data Da by the central processing unit 31 in step 117. The level of "m%" is indicated by the linear line C on the output distribution shown in FIG. 4, and is determined 30%, for example. When the average data Da is smaller than Po·m% (Da<P·m%), the laser power is considered too small, so that the alarm for starting the laser again through manual adjustment, is given in step 120. The adjustment of the X and Y axes is terminated. In the automatic adjustment, the reason for excluding the case that the average data Da is smaller than Po·m% is that the inclination in the region below Po·m% (region between the line C and the horizontal axis) of the graph in FIG. 4 is approximate to that in the region B-C (region between lines B and C) around the peak P, so that it cannot be determined which region the average data Da belongs to.

When this fixed value FIX Da is greater than Po·m% (Da>Po·m%), the central processing unit 31 compares the absolute value of the difference between the power data Dn and power data Dnl+1, (Dan−Da(n+1)) with fixed value FIX as indicated in step 118. This fixed value FIX is set to "8," for example, If the absolute value (Dan−Da(n+1)) is larger than the given fixed value FIX, the power data Dan and Da(n+1) correspond to points on the graph in region B-C between the lines B and C, and when the difference between these two proper data is equal to or greater than 8, i.e., (Dan−Da(n+1))>8, the angle $\theta$ of the resonant mirror 13-2 is negative as apparent from the graph in FIG. 4. The central processing unit 31 therefore gives a control command to one of the X axis and Y axis motor pulse generators 42 or 43 to generate a predetermined number of pulses, for example, +3 pulses, in order to increase the angle $\theta$. When (Dan−Da(n+1))<8, it is apparent from the graph in FIG. 4 that the angle $\theta$ of the resonant mirror 13-2 is positive. Accordingly, the central processing unit 31 sends out a control command to one of the pulse generators 42 or 43 to generate a predetermined number of pulses, e.g., −3 pulses, in order to decrease the angle i of the resonant mirror 13-2. (The "+" sign in "+3 pulses" means a control signal to rotate the screw 15 clockwise CW, and the "−" sign in "−3 pulses" a control signal to rotate the screw 15 counterclockwise CCW.) As a result, the drivers 44 and 45 are driven to activate the associated motor 22 or 21, driving the screw 15 forward or backward by an amount corresponding to 3 pulses. The resonant mirror 13-2 tilts accordingly. As the mirror 13-2 inclines by an adjusting angle 8a, the laser power is changed.

When the absolute value (|Dan−Da(n+1)|) is not larger than the given fixed value FIX, the power data Dan and power data Da(n+1) correspond to points on the graph in he region P-B between the lines P and B. It is checked if the power data Dan equals the power data Da(n+1). If they are not equal to each other (Dan ≠ Da(n+1)), adjustment in the region P-B between the lines P and B will be initiated. When the power data Da(n+1) is smaller than the power data Dan, the central processing unit 31 sends a control signal to one of the X axis and Y axis motor pulse generators 42 or 43 to generate (MB+2)+3 pulses to drive the screw 15 backward, thus slightly tilting the resonant mirror 13-2 in the negative direction. Here, MB corresponds to a mechanical backlash, as will be described later. This mechanical backlash MB is measured in advance, is input to the compensation value setting section 46, and is stored as a characteristic value specific to the system.

Steps 116, 117, 118, 121 and 122 are repeated, and if it is confirmed in step 121 that the power data Dan equals the power data Da(n+1), i.e., (Dan =Da(n+1)), adjustment for points around the peak P will be initiated. When the power data Da(n+1) is equal to the power data Dan, the central processing unit 31 sends a control signal to one of the X axis and Y axis motor pulse generators 42 or 43 to generate one pulse to drive the screw 15 backward by an amount corresponding to one pulse. When the power data Da(n+m+1) is equal to the power data Da(n+m), the central processing unit 31 sends a control signal to one of the X axis and Y axis motor pulse generators 42 or 43 to generate (MB +m/2) pulses to drive the screw 15 backward by an amount corresponding to (MB +m/2) pulses. Consequently, the resonant mirror 13-2 is positioned at an angle $\theta$p where the peak power can be provided.

When steps 108 and 109 in FIG. 6 are completed as described above, the count for the number of adjustments is incremented by "1" in step 110. A sequence of processes in steps 108, 109 and 110 is repeated until the count reaches a given count J. When the count reaches the given number J, the count is cleared as shown in step 112, and an alarm is set off (step 113), completing the adjusting task.

Figure 8:
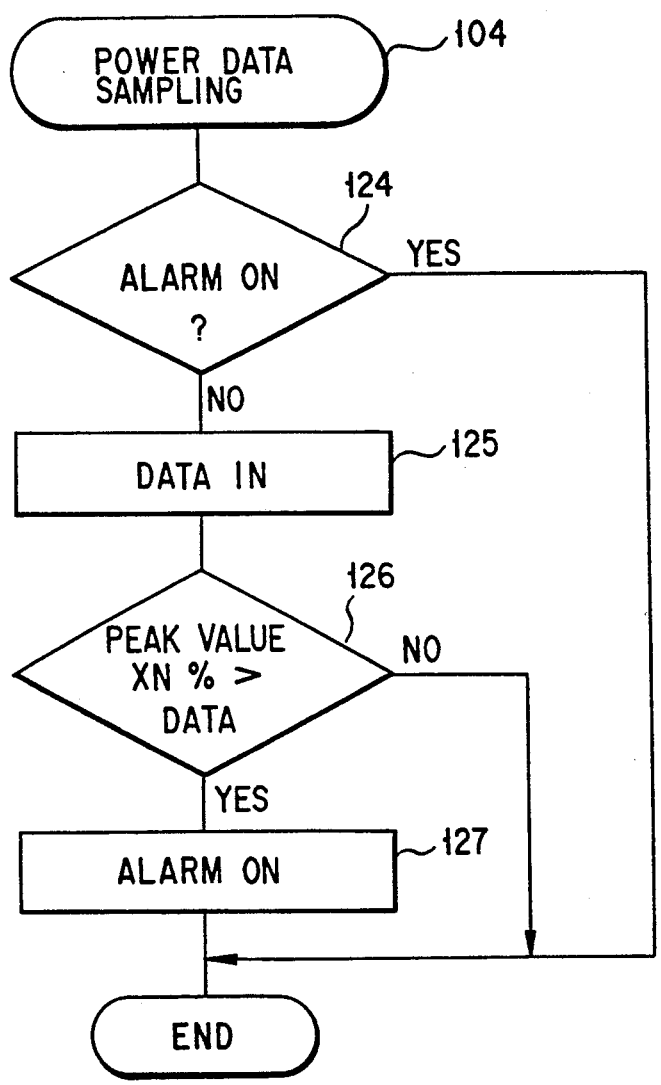
FIG. 8 is a flowchart showing detailed steps for power data sampling in the flowchart in FIG. 6.

When the automatic adjusting step 103 shown in FIG. 3 is completed, sampling power data starts as indicated in step 104. In the power data sampling step 104, the central processing unit 31 first checks if an alarm is set on as shown in FIG. 8. If the alarm is set on, which means execution of adjustment step 103 or 106, the power data sampling step 104 will not be executed. If the alarm is not set on, on the other hand, power data is input to the central processing unit 31 piece after piece as indicated in step 125, and it is checked in step 127 if that data is smaller than N% of the peak value Po, (Po×N%), where N% is defined as a change in laser power as indicated by "301" in FIG. 4, i.e., as a value with the ripples (100−N%) eliminated. In this sampling step 104, therefore, data with the ripples of the laser power removed is compared with the peak value Po. When the sequentially input power data is not smaller than N% of the peak value Po, (Po×N%), which means that the proper adjustment has been performed, the sampling step 104 will be terminated. When the sequentially input power data is smaller than N% of the peak value Po, (Po×N%), which means that the proper adjustment has not been performed, the alarm 128 is set on, informing the improper adjustment, before terminating the sampling step 104.

Figure 9:
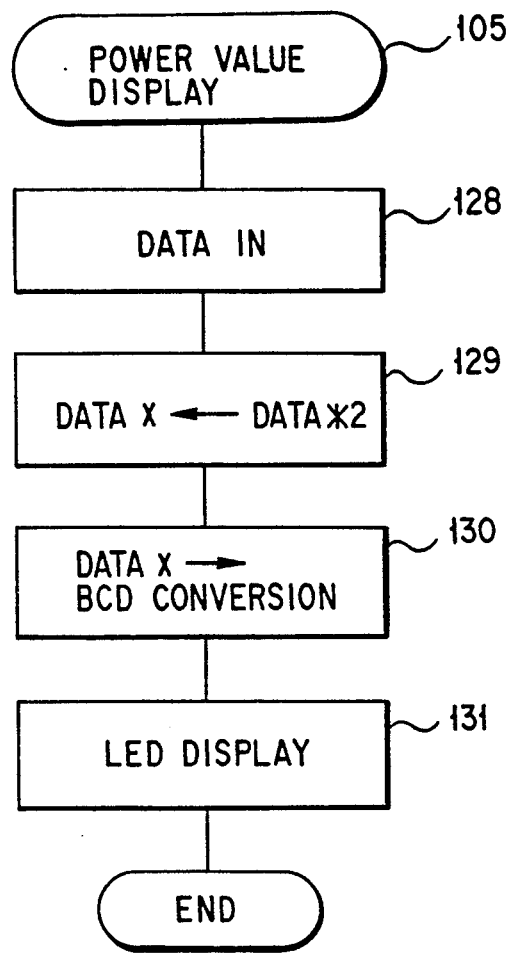
FIG. 9 is a detailed flowchart illustrating steps for power data display in the flowchart in FIG. 6.

The power value display step 105 in FIG. 5 is illustrated in detail in FIG. 9. In this step 105, when data is input as indicated in step 128, this data multiplied by "2" is set as data x as shown in FIG. 129. This data x is subjected to binary code decimal (BCD) conversion as shown in step 130, and the resultant data is then displayed on the LED display of the display section 49 as shown in step 131.

The manual adjustment illustrated in FIG. 5 is executed as shown in FIG. 10. First, it is determined in step 132 if it is the adjustment for the X axis or the Y axis. When the adjustment for the X axis is selected, it is then determined whether the feed screw 15 should be rotated clockwise CW or counterclockwise CCW in step 133. These control commands are input via the manual operating section 47. When the control command specifying the clockwise (CW) rotation of the feed screw 15 is input to the central processing unit 31, this unit 31 sends a control command to the X axis motor pulse generator 42 to generate +1 pulse, as indicated in step 134. As a result, the X axis motor 44 generates a drive signal corresponding to the +1 pulse to drive the motor 22, driving the screw 15 forward. As indicated in step 135, this control command is consecutively sent to the pulse generator 42, so that the screw 15 is driven forward step by step. If the feed screw 15 is determined not to rotate clockwise CW in step 133, it is then determined if this screw 15 should be rotated counterclockwise CCW in step 136. When the feed screw 15 is to be rotated counterclockwise CCW, the unit 31 sends a control command to the X axis motor pulse generator 42 to generate −1 pulse, as indicated in step 137. As a result, the X axis motor 44 generates a drive signal corresponding to the −1 pulse to drive the motor 22, feeding backward the screw 15. As indicated in step 138, this control command is consecutively sent to the pulse generator 42, so that the screw 15 is fed backward continuously. If the feed screw 15 is determined not to rotate counterclockwise CCW in step 136, the manual adjustment will be terminated. If the adjustment for the Y axis is selected, the feed screw associated with the Y axis is driven forward or backward in the same procedures as executed in the case of the adjustment for the X axis, as indicated in step 139.

Figure 12A:
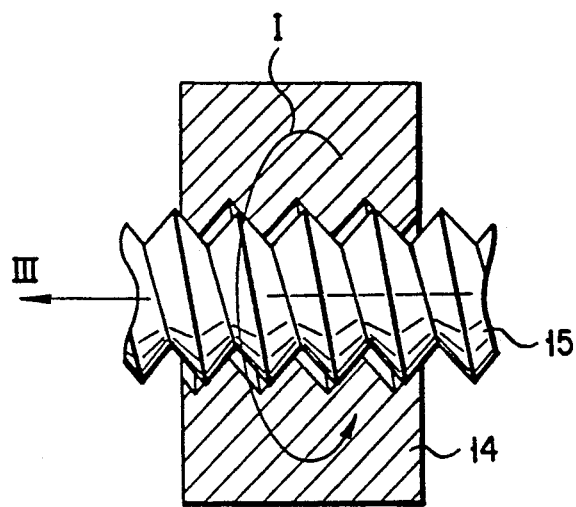
FIG. 12A and 12B are schematic cross-sectional views for explaining the mechanical backlash.
Figure 12B:
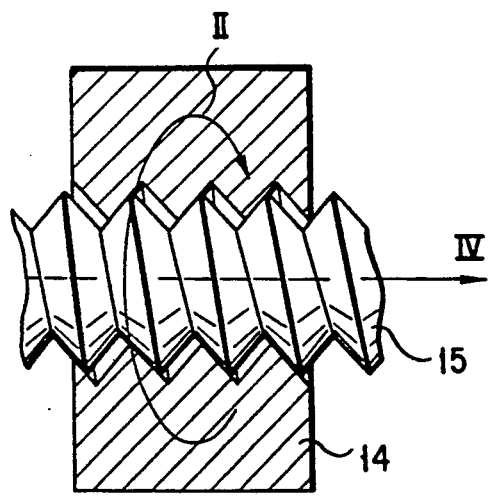

The procedures for acquiring a mechanical backlash will now be explained referring to FIG. 11. The "mechanical backlash" is such a phenomenon that when the feed screw 15 is rotated counterclockwise to be driven backward as indicated in the arrow in FIG. 12B from the state where the screw 15 is rotated clockwise to advance in the arrow direction in FIG. 12A, or vice versa, the screw 15 does not move forward or backward in proportional to the amount of rotation of the screw due to some place between the male screw 15 and female screw 14. This mechanical backlash is a value specific to each mechanism and varying for different combinations of the male screw and female screw.

The procedures for acquiring the mechanical backlash are executed between steps 105 and 102 in the flow shown in FIG. 5. In acquiring the mechanical backlash, first, the central processing unit 31 sends a control command to the pulse generator 42 or 43 to feed the screw 15 clockwise CW by N pulses, moving the screw 15 forward by one pitch or more. Therefore, N is determined as the number of pulses to move the screw 15 forward by one pitch or more. Then, power data D1 to D10 are sampled and the average value data DN, which has the maximum and minimum power data Dmax and Dmm removed, is computed in the central processing unit 31, as indicated in step 133. In the subsequent step 134, the central processing unit 31 sends a control command to the pulse generator 42 or 43 to feed the screw 15 counterclockwise CCW by one pulse, moving the screw 15 backward accordingly. When the screw 15 is driven backward, the count is incremented by "1" as indicated in step 135, and an average value data DN-1 is acquired in step 136 in the same manner as done in step 133. The average value data DN is compared with the average value data DN-1 in step 137. If they are not equal to each other, a sequence of steps 134, 135 and 136 is repeated. When the average value data DN equals the average value data DN-1, the value counted up in step 135 is stored as a compensation value in the compensation value setting section 46 in step 138. The initial value of "CNT" in step 135 is zero, and CNT when DN equals DN-1 corresponds to the number of pulses for the mechanical backlash MB.

The adjustment for the peak value of the laser power illustrated in FIG. 5 will be completed in several seconds to several tens of seconds, ensuring a quick automatic adjustment. With regard to the accuracy, with the true peak value set to 100% without any erroneous discrimination of the peak value, it was confirmed that a high accuracy of 97% or greater could be achieved according to this embodiment. Although the routine for scanning the peak value for the X direction is conducted first in this embodiment, the same routine for the Y direction may be executed first.

As described above, when adjustment of the peak value of the laser power is performed by while driving one of the resonant mirrors by means of the X axis and Y axis driving motors and detecting the laser power value, the averaging of the detected power values is performed and it is determined where on the output distribution the detected power values lie, and the adjustment is carried out in accordance with the determined values. Unlike the conventional case, ripples will not be mistaken for the peak value, and, what is more, the peak value can be scanned and automatically set at high speed and high accuracy.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A system for adjusting a laser oscillator comprising:
   a laser oscillator for generating a laser beam, including,
     a laser medium for generating a laser wave;
     a pair of resonant mirrors arranged to face each other with said laser medium in between, and perpendicular to said laser wave, and
     tilting means for slightly tilting one of said resonant mirrors in first and second directions approximately perpendicular to each other;
   means for detecting a laser beam whose power varies in an output distribution having a peak according to slight tilting of said one of said resonant mirrors in one of said first and second directions, and generating a power signal corresponding to said power; and
   arithmetic operation means for consecutively sampling said power signal by a predetermined number of times, averaging values of sampled power signals to acquire first and second laser power average values close to each other on said output distribution, and determining to which positions on said output distribution said first and second laser power average values correspond, in accordance with amounts of change in said acquired laser power average values, thereby generating a control signal to urge said tilting means.

2. A system according to claim 1, wherein said arithmetic operation means determines whether to increase or decrease slight tilting of said resonant mirrors based on amounts of change in said first and second laser power average values, and generates a control signal specifying an increase or decrease of tilting accordingly.

3. A system according to claim 1, wherein said tilting means includes a tilting mechanism having a mechanical backlash.

4. A system according to claim 3, wherein said arithmetic operation means generates a control signal including a compensation signal to compensate for said mechanical backlash.

5. A system according to claim 4, wherein said arithmetic operation means computes a laser power average value from said mechanical backlash and generates said compensation signal.

6. A system according to claim 5, wherein said arithmetic operation means includes means for storing said compensation signal.

7. A system according to claim 1, wherein said arithmetic operation means determines an amount of tilting in accordance with to which positions on said output distribution said first and second laser power average values correspond, and generates said control signal to urge said tilting mean in accordance with said determined amount of tilting.

8. A system according to claim 7, wherein when said first and second laser power average values close to a peak value on said output distribution, said arithmetic operation means determines a smallest amount of tilting and generates said control signal in accordance with said smallest amount of tilting.

9. A system according to claim 1, further comprising means for presenting a display indicating tilting adjustment by said tilting means in progress during said tilting adjustment.

* * * * *